US012359571B2

(12) United States Patent
Backhouse

(10) Patent No.: US 12,359,571 B2
(45) Date of Patent: Jul. 15, 2025

(54) METHOD FOR MANUFACTURING A COMPOSITE BLADED DISK OR ROTOR

(71) Applicant: ROLLS-ROYCE plc, London (GB)

(72) Inventor: Robert C. Backhouse, Wells (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/588,423

(22) Filed: Feb. 27, 2024

(65) Prior Publication Data

US 2025/0075625 A1 Mar. 6, 2025

(30) Foreign Application Priority Data

Mar. 10, 2023 (GB) ...................................... 2303505

(51) Int. Cl.
*F01D 5/30* (2006.01)
*F01D 5/28* (2006.01)

(52) U.S. Cl.
CPC ........... *F01D 5/282* (2013.01); *F01D 5/3007* (2013.01); *F05D 2230/23* (2013.01); *F05D 2230/90* (2013.01); *F05D 2300/603* (2013.01)

(58) Field of Classification Search
CPC .......... F01D 5/282; F01D 5/3007; F01D 5/30; F05D 2230/23
See application file for complete search history.

(56) References Cited

U.S. PATENT DOCUMENTS 3,532,438 A 10/1970 Palfreyman et al.
3,632,460 A 1/1972 Palfreyman et al.
4,464,097 A 8/1984 Schultz
4,576,770 A * 3/1986 Schultz .................. B29C 70/24 264/129
9,790,802 B2 * 10/2017 Herraiz .................. F01D 5/282
10,876,405 B2 12/2020 Yoshida et al.
11,428,107 B2 8/2022 Shi et al.
2011/0052371 A1 3/2011 Aschenbruck et al.
2012/0045606 A1 2/2012 Griess et al.
2019/0003309 A1 1/2019 Yoshida et al.

OTHER PUBLICATIONS

European search report dated Jun. 13, 2024, issued in EP Patent Application No. 24156979.7.
Great Britain search report dated Sep. 8, 2023, issued in GB Patent Application No. 2303505.8.

* cited by examiner

*Primary Examiner* — Michael L Sehn

(57) ABSTRACT

A method includes forming a moulded component that is axisymmetric about a component axis; segmenting the moulded component into a plurality of segments, each pair of adjacent segments including a pair of surfaces that is formed during segmentation of the moulded component; providing, via computerised numerical control machining, complementary finger joint profiles on the pair of surfaces of the each pair of adjacent segments; providing a plurality of slots on at least one of the pair of surfaces of the each pair of adjacent segments; positioning a plurality of blades partially within the plurality of slots; mating the complementary finger joint profiles provided on the pair of surfaces of the each pair of adjacent segments; and joining the each pair of adjacent segments to each other, such that the plurality of blades is retained within the plurality of slots.

16 Claims, 10 Drawing Sheets

METHOD FOR MANUFACTURING A COMPOSITE BLADED DISK OR ROTOR

CROSS-REFERENCE TO RELATED APPLICATIONS

This specification is based upon and claims the benefit of priority from United Kingdom patent application number GB 2303505.8 filed on Mar. 10, 2023, the entire contents of which is incorporated herein by reference.

BACKGROUND

Technical Field

The present disclosure relates generally to a method for manufacturing a composite bladed disk or rotor for a gas turbine engine.

Description of the Related Art

A gas turbine engine typically includes, in axial series, a compressor, combustion equipment, and a turbine that drives the compressor. During operation, air is compressed by the compressor, the compressed air is mixed with fuel and combusted by the combustion equipment, and the resulting combustion products are expelled through the turbine.

The compressor may include a bladed disk or rotor including a disk and a plurality of blades mounted on the disk. It may be advantageous to manufacture the disk from composite materials as opposed to metals, for example, to reduce the weight of the bladed disk or rotor. However, conventional manufacturing techniques may require complex tooling and moulding processes for manufacturing the disk from composite materials as well as complicated assembly processes for mounting the plurality of blades on the disk. Therefore, conventional manufacturing techniques may be complicated and uneconomical.

SUMMARY

According to a first aspect there is provided a method for manufacturing a composite bladed disk or rotor for a gas turbine engine. The method includes forming a moulded component from at least one composite material. The moulded component is axisymmetric about a component axis. The method further includes segmenting the moulded component into a plurality of segments disposed adjacent to each other. Each pair of adjacent segments from the plurality of segments includes a pair of surfaces that is formed during segmentation of the moulded component. The method further includes providing, via computerised numerical control (CNC) machining, complementary finger joint profiles on the pair of surfaces of the each pair of adjacent segments. The method further includes providing a plurality of slots on at least one of the pair of surfaces of the each pair of adjacent segments. Each of the plurality of slots at least partially extends along the component axis and perpendicularly to the component axis. The method further includes positioning a plurality of blades partially within the plurality of slots. The method further includes mating the complementary finger joint profiles provided on the pair of surfaces of the each pair of adjacent segments. The method further includes joining the each pair of adjacent segments to each other, such that the plurality of blades is retained within the plurality of slots.

The method of the present disclosure may facilitate mounting of the plurality of blades to the moulded component (which may correspond to a rotor disk). Specifically, mounting of the plurality of blades to the moulded component may be facilitated by providing the plurality of slots, positioning the plurality of blades partially within the plurality of slots, and joining the each pair of adjacent segments to each other. Each of the plurality of blades may consequently be permanently trapped or retained within a corresponding slot from the plurality of slots.

Further, the complementary finger joint profiles may allow providing a reliable structural joint between the each pair of adjacent segments, which may be capable of withstanding loads during operation of the gas turbine engine. Moreover, the method may allow tailoring the complementary finger joint profiles to suit the duty/load case of the structural joint. That is, the design and size of the complementary finger joint profiles may be modified according to the performance requirements. This may ensure that segmenting the moulded component into the plurality of segments and joining the plurality of segments may not negatively affect the load bearing capacity of the moulded component.

The method may further allow the use of blades made from composite materials as well as metals and having different retention features (such as dovetail features and fir-tree features). The method may also allow the use of various different composite materials as well as hybrid assemblies containing mixed classes of materials to manufacture the composite bladed disk or rotor, based on desired application requirements.

The method may therefore be simple, economical, allow flexibility in material choice as per application requirements, and may be carried out without the need to use complex tooling and moulding processes.

In some embodiments, forming the moulded component includes depositing the at least one composite material on a mandrel.

In some embodiments, the method further includes removing the mandrel from the moulded component prior to segmenting the moulded component.

The moulded component may therefore be economically formed using, for example, filament winding.

In some embodiments, the moulded component forms a plurality of stages of the composite bladed disk or rotor. The plurality of blades of the each pair of adjacent segments includes a corresponding stage from the plurality of stages.

In some embodiments, the at least one composite material includes a plurality of composite materials that differ from each other. Each of the plurality of segments includes a corresponding composite material from the plurality of composite materials.

Advantageously, the method may allow forming the plurality of segments with composite materials having different properties (for example, thermal capabilities). Therefore, it may be possible to select composite materials based on the operational thermal environment of a segment. For example, an axially downstream segment may be made from a composite material that has a greater thermal capacity than that of an axially upstream segment.

In some embodiments, each of the complementary finger joint profiles includes a plurality of circumferential fingers concentrically spaced apart from each other with respect to the component axis.

In some embodiments, each of the complementary finger joint profiles comprises a plurality of fingers extending perpendicularly to the component axis.

Thus, the method may allow flexibility in designing the complementary finger joint profiles based on the desired application requirements.

In some embodiments, each adjacent segment of the each pair of adjacent segments has a section thickness defined perpendicularly to the component axis. Each of the complementary finger joint profiles includes a plurality of fingers. Each of the plurality of fingers has a length defined along the component axis. The length is from 0.5 times to 2 times of the section thickness.

The aforementioned length of the plurality of fingers may ensure that a reliable structural joint can be formed between the each pair of adjacent segments when the each pair of adjacent segments are joined.

In some embodiments, each of the plurality of slots is a dovetail slot.

The dovetail slot of each of the plurality of slots may receive a blade having a dovetail retention feature.

In some embodiments, the method further includes applying a joint adhesive layer on at least one of the complementary finger joint profiles prior to mating the complementary finger joint profiles of the each pair of adjacent segments.

The joint adhesive layer may improve joining of the each pair of adjacent segments and may improve the robustness of the joint formed between the each pair of adjacent segments.

In some embodiments, joining the each pair of adjacent segments includes curing the joint adhesive layer.

The joint adhesive layer may include an adhesive that can be cured to provide a strong, permanent, and robust bond between the each pair of adjacent segments. An example of such adhesive includes an epoxy adhesive.

In some embodiments, the method further includes applying a slot adhesive layer in each of the plurality of slots prior to positioning the plurality of blades partially within the plurality of slots, such that each of the plurality of blades is bonded to at least one of the each pair of adjacent segments.

The slot adhesive layer may ensure retention of the plurality of blades with the plurality of slots.

In some embodiments, the method further includes providing an alignment feature on the each pair of adjacent segments. The method further includes aligning the each pair of adjacent segments with each other based on the alignment feature prior to mating the complementary finger joint profiles of the each pair of adjacent segments.

The alignment feature may facilitate aligning of the each pair of adjacent segments with each other, and as a result may improve the robustness of the joint formed between the each pair of adjacent segments.

In some embodiments, the method further includes coupling the moulded component to a drive shaft of the gas turbine engine.

The drive shaft of the gas turbine engine may drive the composite bladed disk or rotor.

According to a second aspect there is provided a composite bladed disk or rotor manufactured by the method of the first aspect.

The bladed disk or rotor may be simple and economical to manufacture using the method of the present disclosure. The composite bladed disk or rotor that is manufactured using the method may be suitable for use as a single-stage or multi-stage compressor.

According to a third aspect there is provided a gas turbine engine that includes a composite bladed disk or rotor of the second aspect.

The gas turbine engine may benefit from the weight and cost savings of the composite bladed disk or rotor as compared to a metallic bladed disk or rotor. For example, an aircraft including the gas turbine engine that includes the composite bladed disk or rotor may have a greater fuel efficiency as compared to a gas turbine engine including a metallic bladed disk or rotor due to weight savings offered by the composite bladed disk.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24, or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
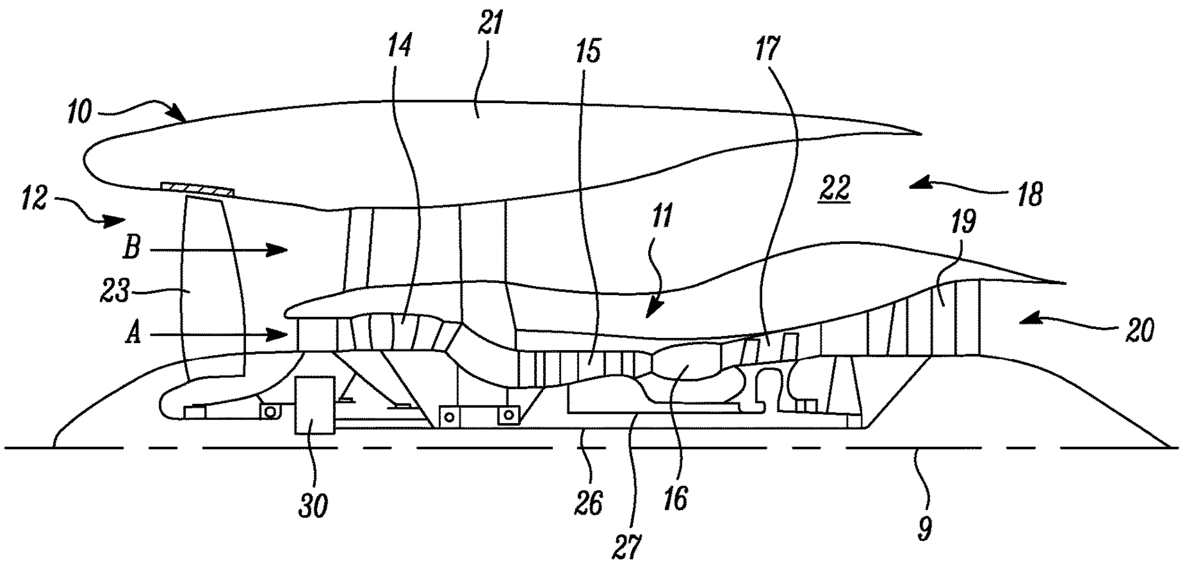
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

As used in the present disclosure, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

Figure 2:
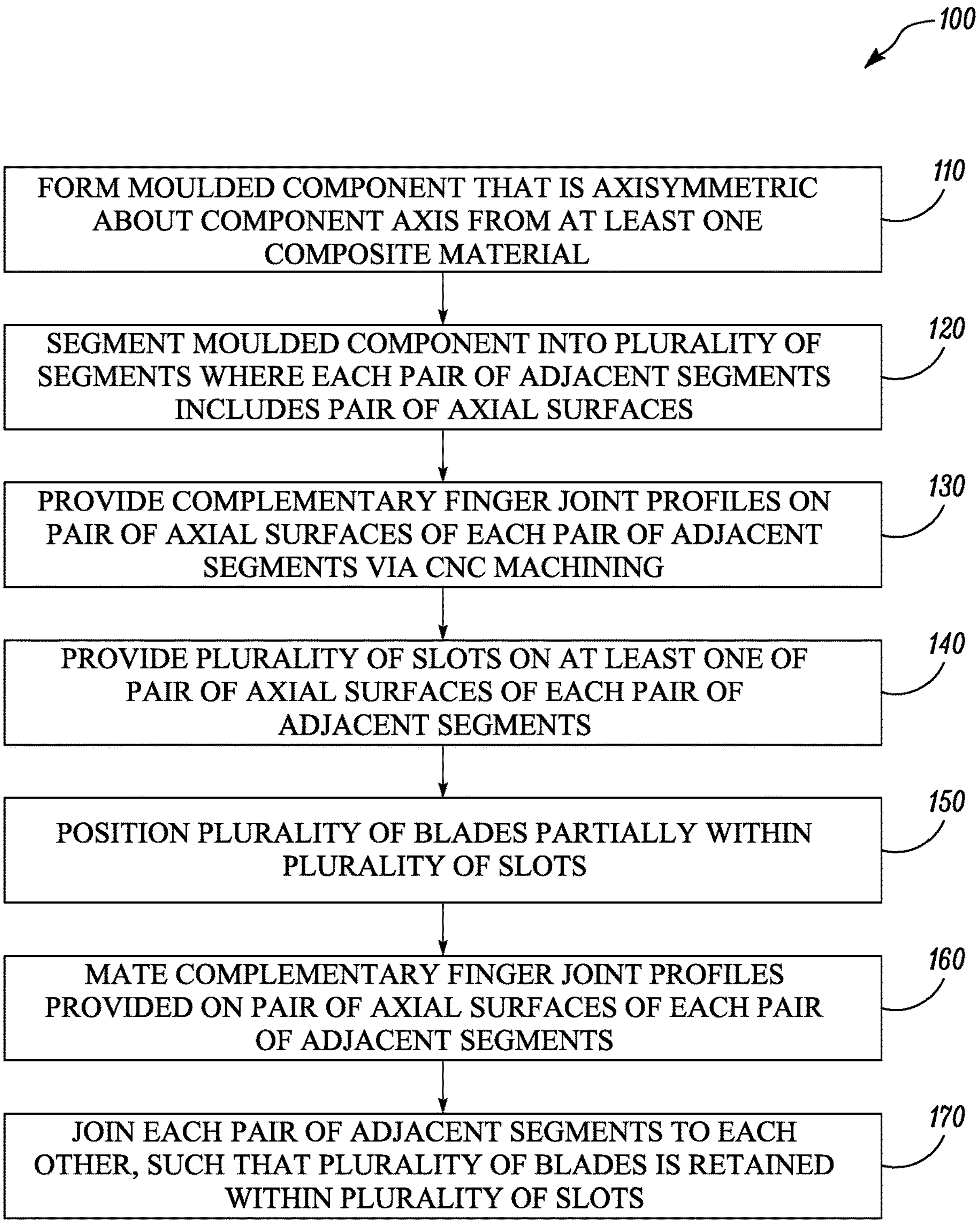
FIG. 2 is a flowchart depicting various steps of a method for manufacturing a composite bladed disk or rotor for a gas turbine engine in accordance with an embodiment of the present disclosure.

FIG. 2 shows a flowchart depicting various steps of a method 100 for manufacturing a composite bladed disk or rotor for a gas turbine engine, such as the gas turbine engine 10 of FIG. 1, in accordance with an embodiment of the present disclosure. The composite bladed disk or rotor may be included in, for example, the low pressure compressor 14 or the high pressure compressor 15 of FIG. 1. The method 100 will be described with further reference to FIGS. 3A to 9B, which schematically depict the various steps of the method 100.

At step 110, the method 100 includes forming a moulded component from at least one composite material. As used in the present disclosure, the term "composite material" refers to a material including an additive material and a matrix material that supports the additive material. The additive material may be embedded in the matrix material. The matrix material may be, for example, organic/polymeric and/or ceramic. In other words, composite materials may include organic/polymer matrix composites and/or ceramic matrix composites. The matrix material may be thermosetting or thermoplastic. The additive material may be a reinforcing material. The additive material may include, but is not limited to, carbon, glass, graphite, aramid, and organic fibre of any length, size, and orientation.

Furthermore, the moulded component is axisymmetric about a component axis. The moulded component may therefore be a rotationally symmetric component. The moulded component may correspond to a rotor disk (also referred to as "rotor drum" and "rotor hub").

Figure 3A:
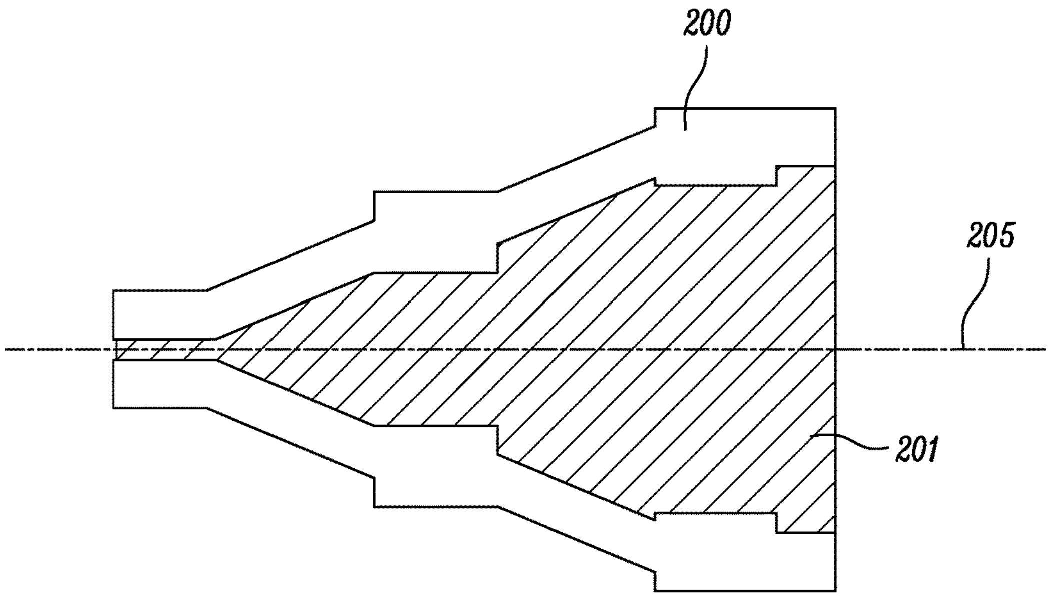
FIG. 3A is a schematic sectional side view of a moulded component formed on a mandrel in accordance with an embodiment of the present disclosure.

Referring to FIG. 3A, for example, the method 100 may include forming a moulded component 200 from at least one composite material. The moulded component 200 may be axisymmetric about a component axis 205.

The moulded component 200 may be formed using any suitable method, and the disclosure is not limited thereto. For example, the moulded component 200 may be formed using automated fibre placement (AFP), filament winding, hand layup, pick and place automation, and the like.

Figure 3B:
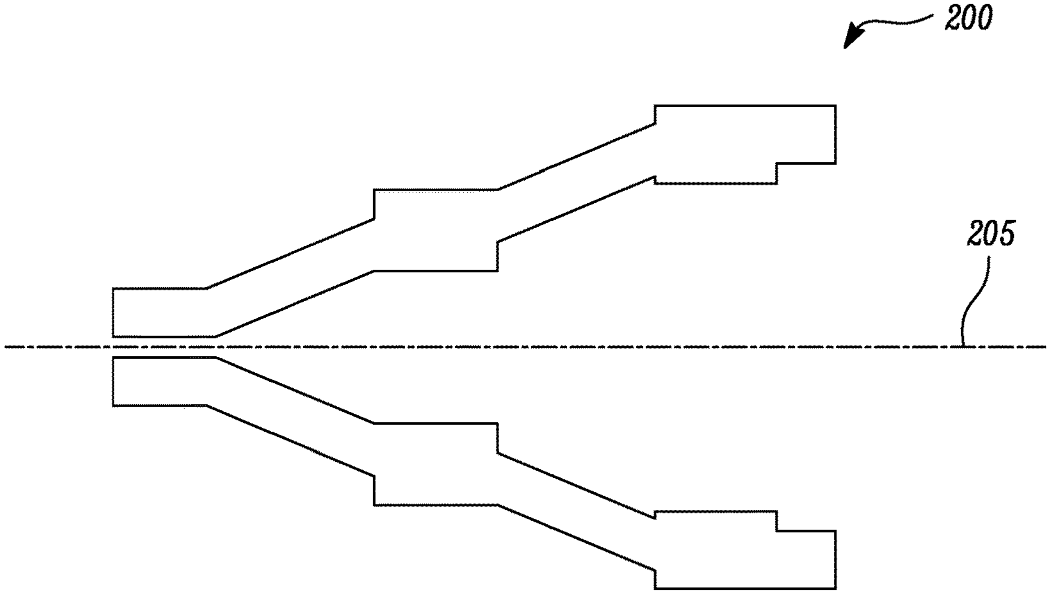
FIG. 3B is a schematic sectional side view of the moulded component with the mandrel removed therefrom in accordance with an embodiment of the present disclosure.

In some embodiments, forming the moulded component may include depositing the at least one composite material on a mandrel. Referring to FIG. 3A, for example, forming the moulded component 200 may include depositing the at least one composite material on a mandrel 201. The mandrel 201 is hatched in FIG. 3A for clarity purposes. The at least one composite material may be deposited on the mandrel 201 from a prepreg tape. The prepreg tape may be a thermoplastic or a thermosetting composite prepreg tape. The moulded component 200, once formed, may be removed from the mandrel 201, as shown in FIG. 3B.

In some examples, the mandrel 201 may be a filament winding mandrel that defines an inner surface of the moulded component 200, and the moulded component 200 may be formed using a filament winding process. In some examples, the moulded component 200 may be formed by employing a wet filament winding process using dry carbon fibre and a liquid matrix resin.

At step 120, the method 100 further includes segmenting the moulded component into a plurality of segments disposed adjacent to each other. Each pair of adjacent segments from the plurality of segments includes a pair of surfaces that is formed during segmentation of the moulded component.

Figure 4A:
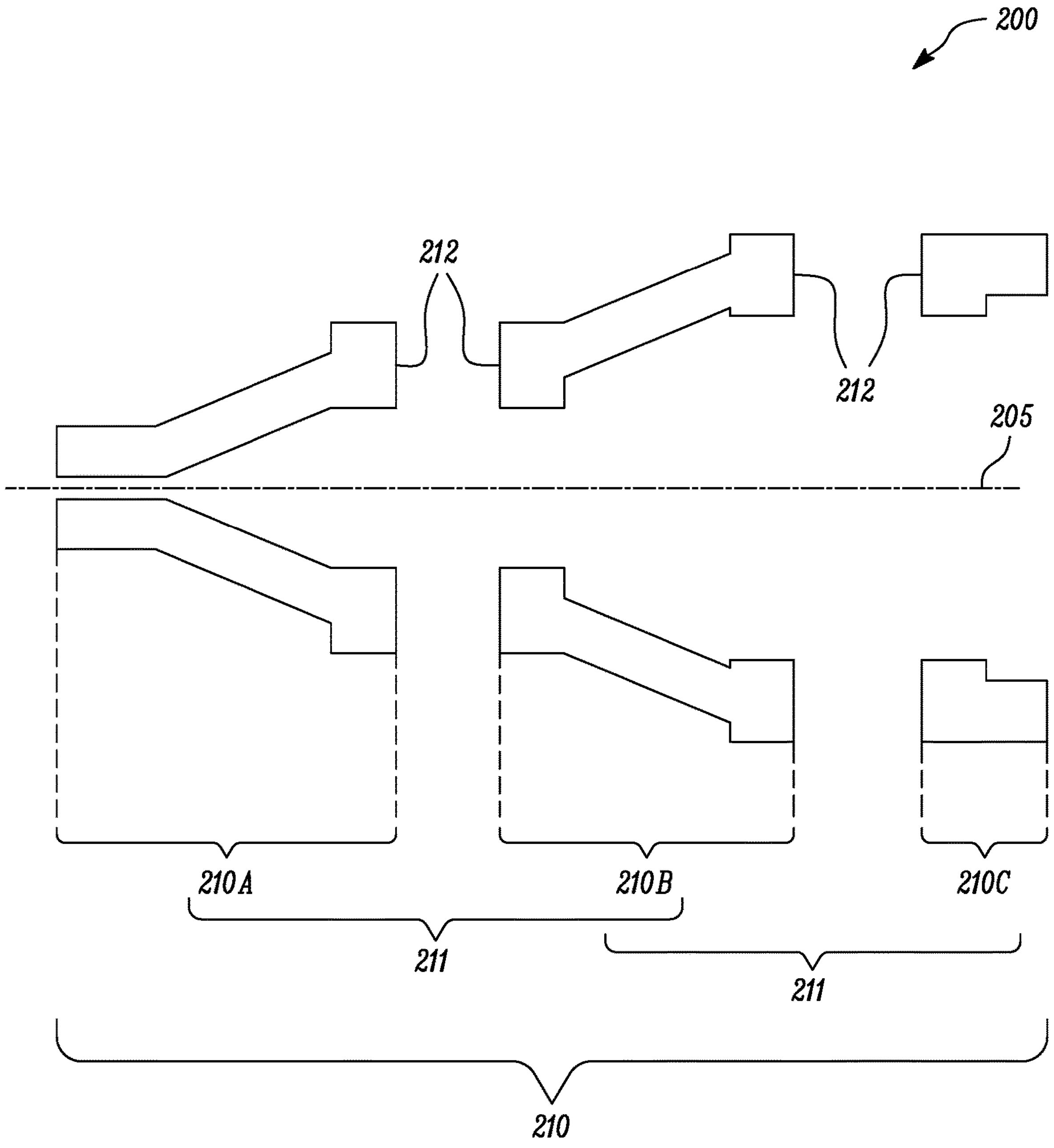
FIG. 4A is a schematic sectional side view of the moulded component after segmenting the moulded component into a plurality of segments in accordance with an embodiment of the present disclosure.

Referring to FIG. 4A, for example, the method 100 may include segmenting the moulded component 200 into a plurality of segments 210 disposed adjacent to each other. For example, in FIG. 4A, the moulded component 200 is segmented into a first segment 210A, a second segment 210B, and a third segment 210C. In other words, the plurality of segments 210 includes the first segment 210A, the second segment 210B, and the third segment 210C.

Each pair of adjacent segments 211 from the plurality of segments 210 includes a pair of surfaces 212 that is formed during segmentation of the moulded component 200. In the present disclosure, the reference character "211" is used to generally indicate each pair of adjacent segments from the plurality of segments 210. For example, in FIG. 4A, the plurality of segments 210 includes a pair of adjacent segments 211 that includes the first segment 210A and the second segment 2101B, and another pair of adjacent segments 211 that includes the second segment 210B and the third segment 210C. Furthermore, each pair of adjacent segments 211 includes the pair of surfaces 212 that is formed during segmentation of the moulded component 200.

In some embodiments, the at least one composite material may include a plurality of composite materials that differ from each other. Each of the plurality of segments may include a corresponding composite material from the plurality of composite materials. Referring to FIG. 4A, for example, the first segment 210A may include a first composite material, the second segment 210B may include a second composite material, and the third segment 210C may include a third composite material. In other words, the first segment 210A may be formed from the first composite material, the second segment 210B may be formed from the second composite material, and the third segment 210C may be formed from the third composite material. The first, second, and third composite materials may differ from each other. For example, the first, second, and third composite materials may have different thermal capabilities.

In some embodiments, the method 100 may further include removing the mandrel from the moulded component prior to segmenting the moulded component. Referring to FIGS. 3A and 3B, for example, the method 100 may include removing the mandrel 201 (shown in FIG. 3A) from the moulded component 200 prior to segmenting the moulded component 200. FIG. 3B shows the moulded component 200 with the mandrel 201 removed therefrom.

Figure 4B:
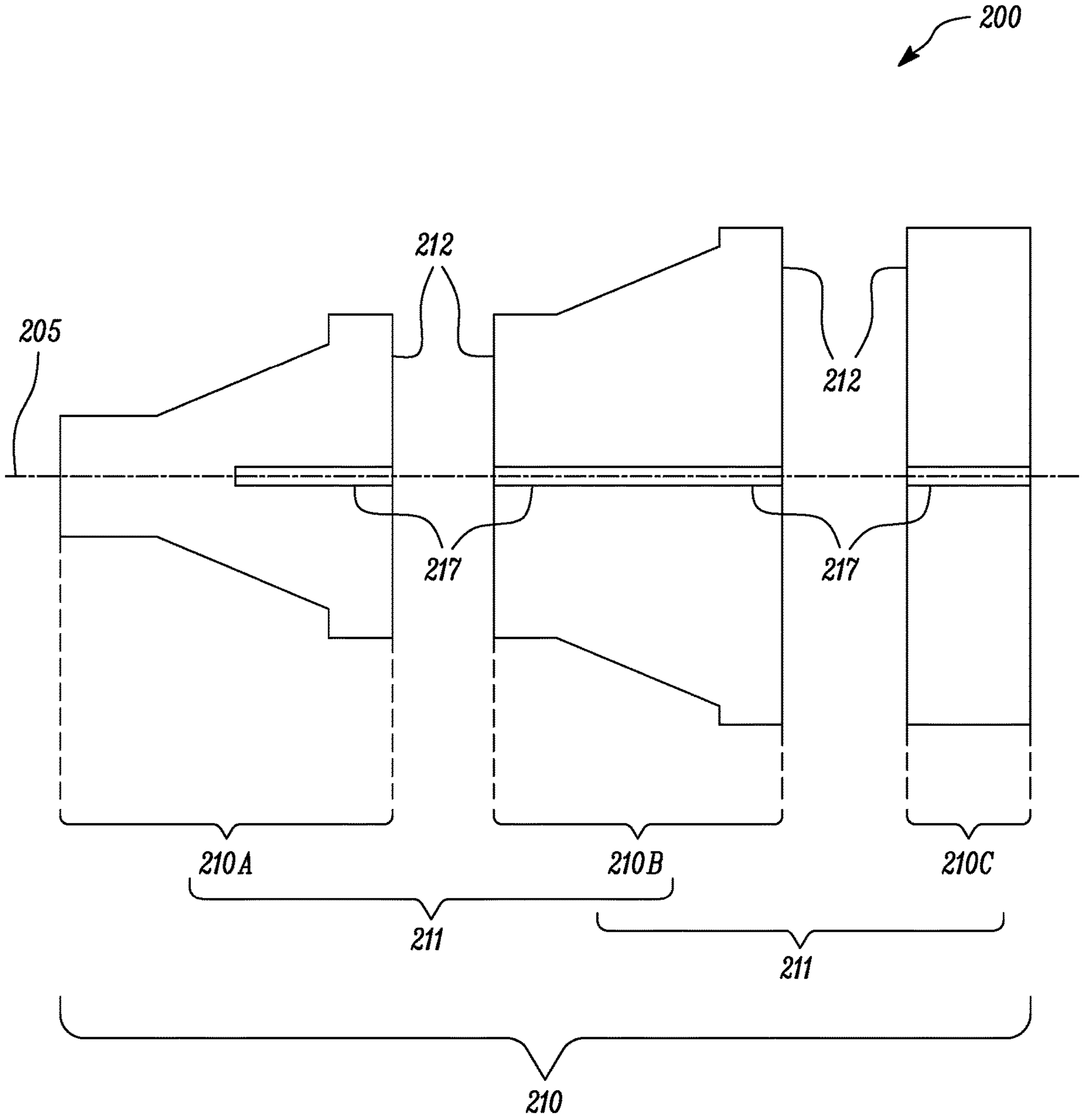
FIG. 4B is a schematic top view of the moulded component in accordance with an embodiment of the present disclosure.

In some embodiments, the method 100 may further include providing an alignment feature on each pair of adjacent segments. Referring to FIG. 4B, for example, the method 100 may include providing an alignment feature 217 on each pair of adjacent segments 211. The alignment feature 217 may include indicia, markings, and the like to facilitate aligning each pair of adjacent segments 211. The alignment feature 217 may be provided on the moulded component 200 prior to segmenting the moulded component 200 into the plurality of segments 210. The alignment feature 217 may extend at least partially along the component axis 205. The alignment feature 217 may be aligned with the component axis 205.

At step 130, the method 100 further includes providing, via computerised numerical control (CNC) machining, complementary finger joint profiles on the pair of surfaces of each pair of adjacent segments.

Figure 5A:
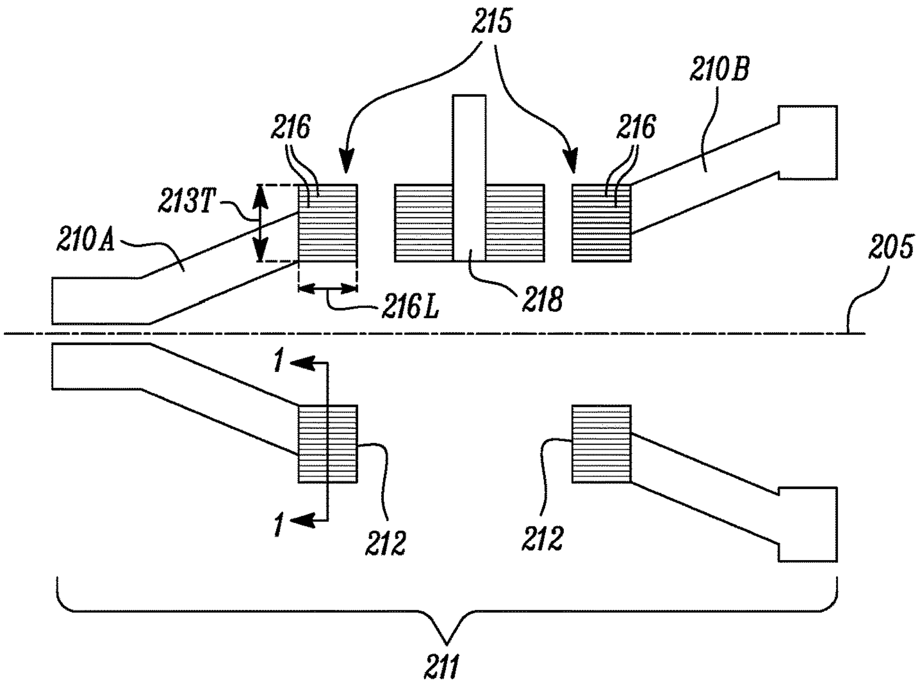
FIG. 5A is a schematic sectional side view of a pair of adjacent segments of the moulded component after providing complementary finger joint profiles in accordance with an embodiment of the present disclosure.
Figure 5B:
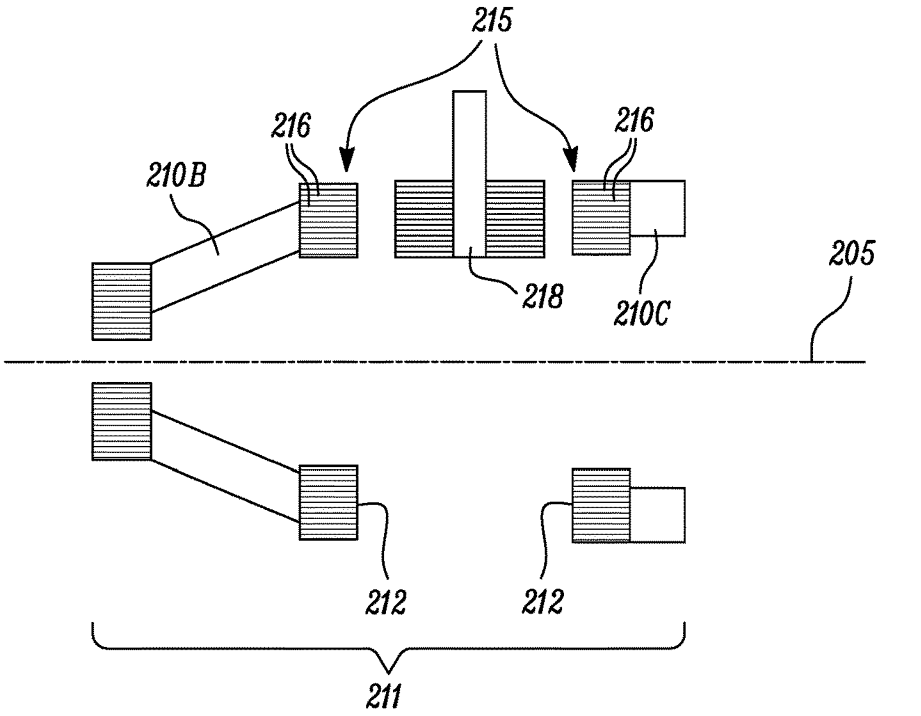
FIG. 5B is a schematic sectional side view of another pair of adjacent segments of the moulded component after providing complementary finger joint profiles in accordance with an embodiment of the present disclosure.

Referring to FIGS. 5A and 5B, for example, the method 100 may include providing, via CNC machining, complementary finger joint profiles 215 on the pair of surfaces 212 of each pair of adjacent segments 211. The complementary finger joint profiles 215 may be machined by a cutting tool 218 that is part of a CNC machine. The complementary finger joint profiles 215 may be machined by, for example, turning, milling, and/or grinding.

Each of the complementary finger joint profiles may include a plurality of fingers. Referring to FIGS. 5A and 5B, for example, each of the complementary finger joint profiles 215 may include a plurality of fingers 216.

Figure 6A:
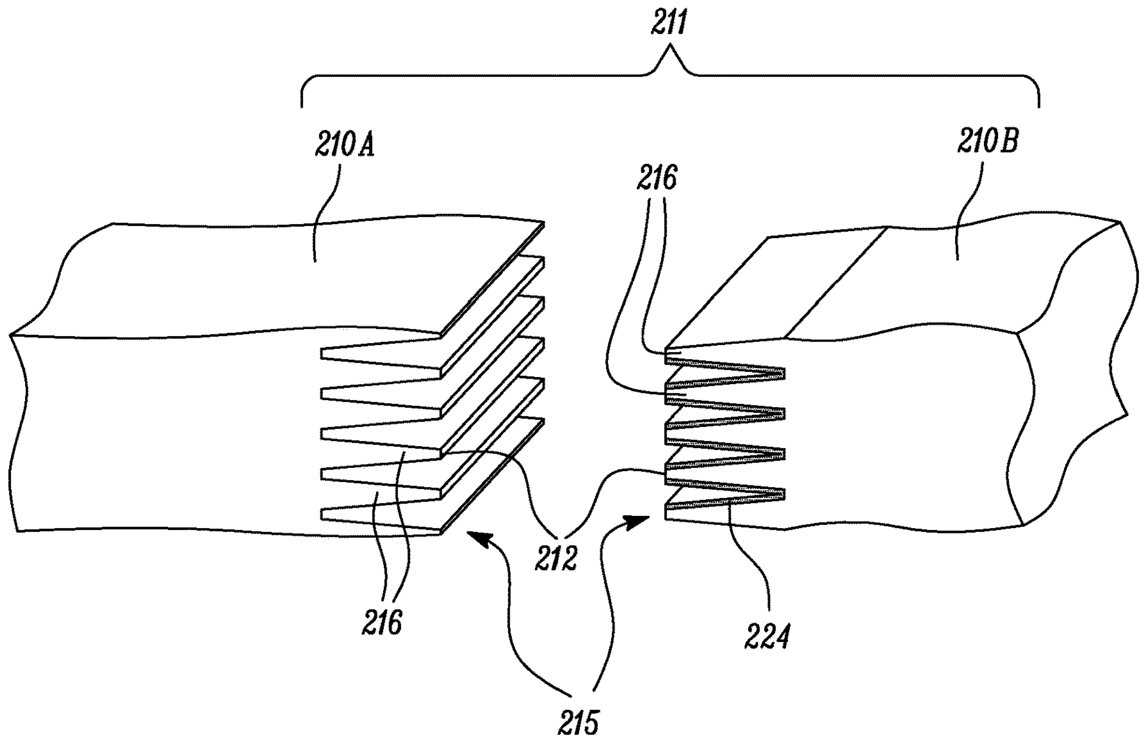
FIG. 6A is a schematic perspective view partially showing a pair of adjacent segments and complementary finger joint profiles in accordance with an embodiment of the present disclosure.

FIG. 6A shows a perspective view of portions of the first segment 210A and the second segment 210B and exemplary complementary finger joint profiles 215 including the plurality of fingers 216.

In some embodiments, each adjacent segment of each pair of adjacent segments may have a section thickness defined perpendicularly to the component axis. Further, each of the plurality of fingers may have a length defined along the component axis. The length may be from 0.5 times to 2 times of the section thickness.

Referring to FIG. 5A, for example, each adjacent segment 211 of each pair of adjacent segments 211 may have a section thickness 213T defined perpendicularly to the component axis 205. In FIG. 5A, each of the first segment 210A and the second segment 210B has the section thickness 213T (only indicated on the first segment 210A for illustrative purposes). Further, each of the plurality of fingers 216 may have a length 216L (only indicated on the first segment 210A for illustrative purposes) defined along the component axis 205. The length 216L may be from 0.5 times to 2 times of the section thickness 213T. Preferably, the length 216L may be equal to the section thickness 213T. The length 216L being from 0.5 times to 2 times of the section thickness 213T may increase the robustness of a joint formed by mating and joining the complementary finger joint profiles 215.

Figure 6B:
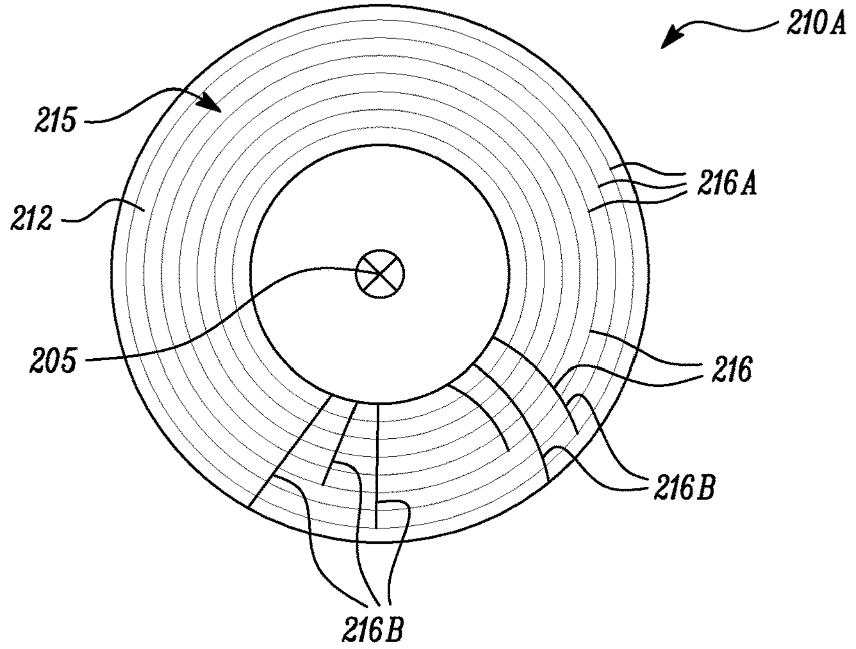
FIG. 6B is a schematic sectional view of a segment of the moulded component taken along line 1-1 of FIG. 5A and showing an exemplary finger joint profile in accordance with an embodiment of the present disclosure.

In some embodiments, each of the complementary finger joint profiles may include a plurality of circumferential fingers concentrically spaced apart from each other with respect to the component axis. Referring to FIG. 6B, for example, each of the complementary finger joint profiles 215 may include a plurality of circumferential fingers 216A concentrically spaced apart from each other with respect to the component axis 205. In other words, in some embodiments, the plurality of fingers 216 may be circumferential and concentrically spaced apart from each other with respect to the component axis 205.

In some embodiments, each of the complementary finger joint profiles may include a plurality of fingers extending perpendicularly to the component axis. Referring to FIG. 6B, for example, each of the complementary finger joint profiles 215 may include a plurality of fingers 216B extending perpendicularly to the component axis 205. In other words, the plurality of fingers 216 may extend perpendicularly to the component axis 205. The plurality of fingers 216B may be linear or curved.

At step 140, the method 100 further includes providing a plurality of slots on at least one of the pair of surfaces of each pair of adjacent segments. Each of the plurality of slots at least partially extends along the component axis and perpendicularly to the component axis.

Figure 7A:
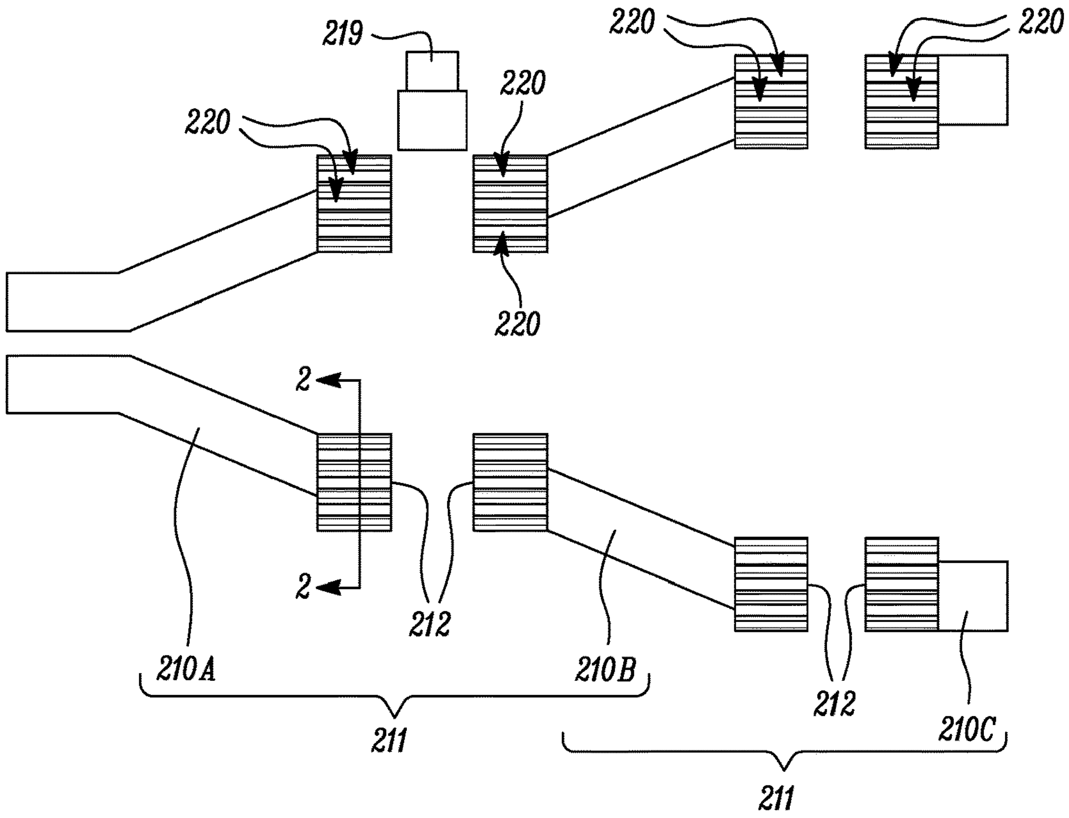
FIG. 7A is a schematic sectional side view of the moulded component after providing a plurality of slots on a pair of surfaces of the pair of adjacent segments of the moulded component in accordance with an embodiment of the present disclosure.

Referring to FIG. 7A, for example, the method 100 may include providing a plurality of slots 220 on at least one of the pair of surfaces 212 of each pair of adjacent segments 211. That is, the plurality of slots 220 may be provided on one of the pair of surfaces 212, or alternatively, the plurality of slots 220 may be provided on each of the pair of surfaces 212. In FIG. 7A, the plurality of slots 220 are provided on each of the pair of surfaces 212.

Each pair of adjacent segments 211 may be indexed and provided with the plurality of slots 220 by, for example, by a cutting tool 219 (shown schematically in FIG. 7A).

Figure 7B:
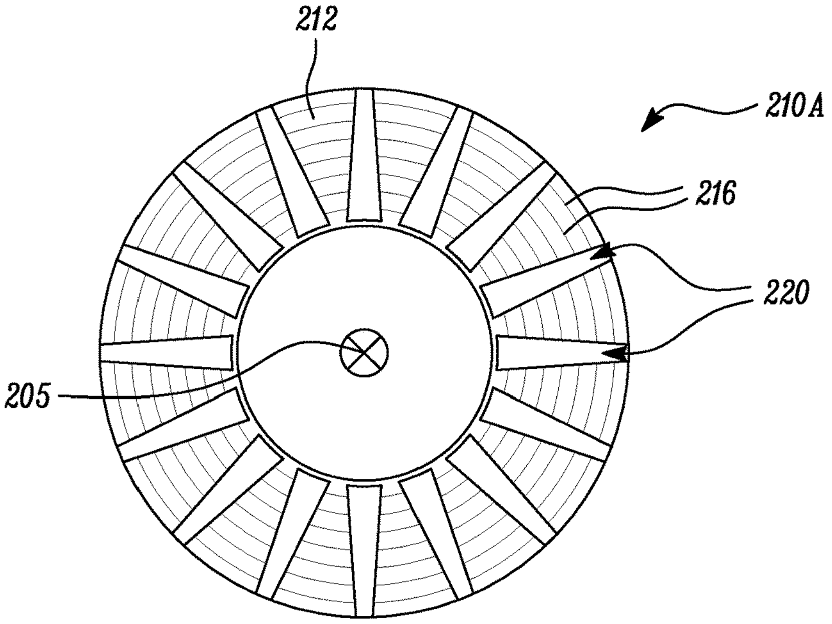
FIG. 7B is a schematic sectional view of a segment of the moulded component taken along line 2-2 of FIG. 7A in accordance with an embodiment of the present disclosure.

Referring to FIG. 7B, each of the plurality of slots 220 may extend perpendicularly to the component axis 205. Each of the plurality of slots 220 may further partially extend along the component axis 205.

In some embodiments, each of the plurality of slots may be a dovetail slot. For example, each of the plurality of slots 220 may be a dovetail slot. Alternatively, in some embodiments, each of the plurality of slots 220 may be a fir tree slot. It may be noted that the plurality of slots 220 may have any suitable configuration to receive a plurality of aerofoils or blades therein.

Figure 8A:
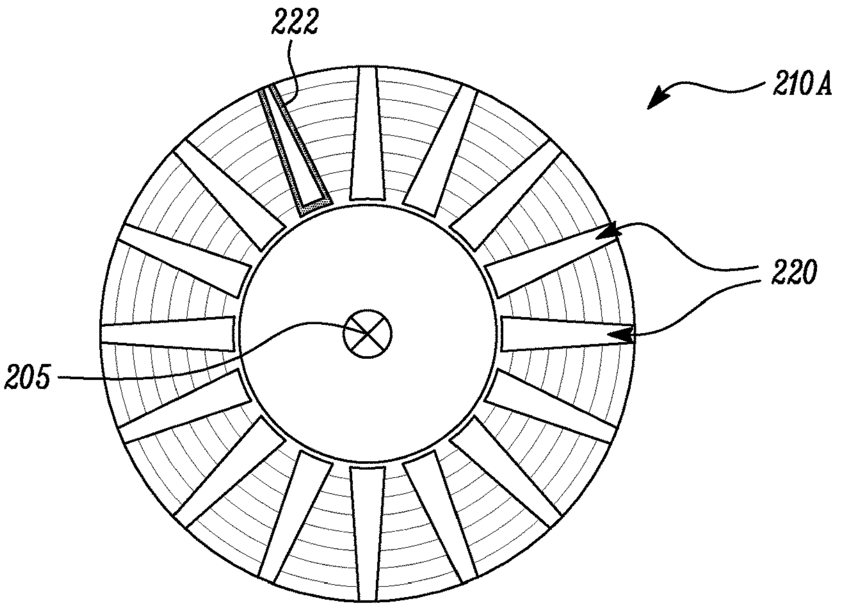
FIG. 8A is a schematic sectional view of the segment of FIG. 7B with a slot adhesive layer applied in accordance with an embodiment of the present disclosure.
Figure 8B:
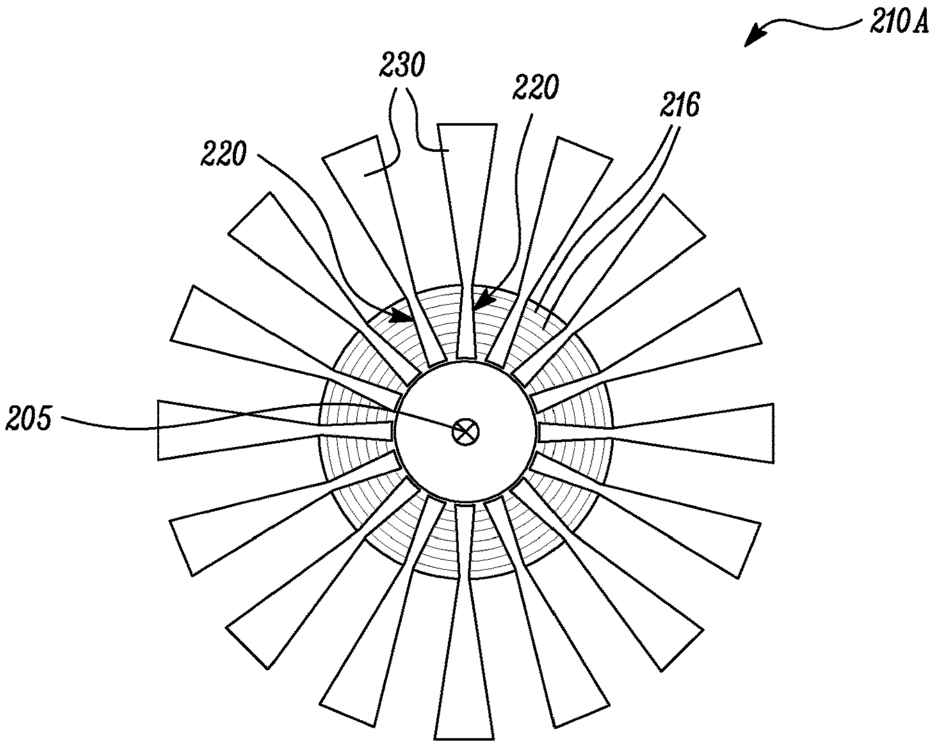
FIG. 8B is a schematic sectional view of the segment of FIG. 7B with a plurality of blades partially positioned partially within a plurality of slots in accordance with an embodiment of the present disclosure.

At step 150, the method 100 further includes positioning a plurality of blades partially within the plurality of slots. Referring to FIG. 8B, for example, the method 100 may include positioning a plurality of blades 230 partially within the plurality of slots 220.

The plurality of blades 230 may be made from composite materials or metallic materials. For example, composite blades may be manufactured by laminating composite materials and autoclave and press moulding the laminated composite materials. Composite blades may also be 3D woven and resin transfer moulded.

Composite blades may also be compression moulded from short fibre reinforced composites or a combination of 'continuous' and short fibre composites. Composite blades may be injection moulded using short fibre composites or a combination of 'continuous' and short fibre composites. Metallic blades they may be cast, forged, machined from solid, additive layer manufactured, metal injection moulded and hot iso-statically pressed, or sintered.

Each of the plurality of slots 220 may partially receive a corresponding blade 230 from the plurality of blades 230. Each of the plurality of blades 230 may include a retention feature (not shown) disposed adjacent to its root. The retention feature of the plurality of blades 230 may be at least partially positioned within the plurality of slots 220.

In some embodiments, the method 100 may further include applying a slot adhesive layer in each of the plurality of slots prior to positioning the plurality of blades partially within the plurality of slots, such that each of the plurality of blades is bonded to at least one of each pair of adjacent segments. Referring to FIG. 8A, for example, the method 100 may include applying a slot adhesive layer 222 (hatched with dots in FIG. 8A) in each of the plurality of slots 220 prior to positioning the plurality of blades 230 partially within the plurality of slots 220. The slot adhesive layer 222 is only shown in one slot 220 in FIG. 8A for illustrative purposes. The slot adhesive layer 222 may be continuous or patterned. The slot adhesive layer 222 may include, for example, an epoxy adhesive. The slot adhesive layer 222 may include any suitable adhesive capable of bonding the plurality of blades 230 to at least one of each pair of adjacent segments 211.

It may be noted that applying the slot adhesive layer 222 in each of the plurality of slots 220 is optional and may be omitted. In some examples, where applying the slot adhesive layer 222 is omitted, the method 100 may include providing an anti-friction coating or an anti-friction liner on each of the plurality of blades 230 or in each of the plurality of slots 220. Moreover, in some examples, the method 100 may also include providing a biasing member (not shown), such as a spring element, to maintain contact of the plurality of blades 230 against the respective plurality of slots 220.

At step 160, the method 100 further includes mating the complementary finger joint profiles provided on the pair of surfaces of the each pair of adjacent segments. Referring to FIG. 6A, for example, the method 100 may include mating the complementary finger joint profiles 215 provided on the pair of surfaces 212 of the pair of adjacent segments 211. A press or similar tools may be employed to move each pair of adjacent segments 211 in order to mate the complementary finger joint profiles 215.

In some embodiments, the method 100 may further include aligning each pair of adjacent segments with each other based on the alignment feature prior to mating the complementary finger joint profiles of the each pair of adjacent segments. For example, the method 100 may further include aligning the each pair of adjacent segments 211 with each other based on the alignment feature 217 (shown in FIG. 4A) prior to mating the complementary finger joint profiles 215 of the each pair of adjacent segments 211.

In some embodiments, the method 100 may further include applying a joint adhesive layer on at least one of the complementary finger joint profiles prior to mating the complementary finger joint profiles of the each pair of adjacent segments. Referring to FIG. 6A, for example, the method 100 may further include applying a joint adhesive layer 224 (hatched with dots in FIG. 6A) on at least one of the complementary finger joint profiles 215 prior to mating the complementary finger joint profiles 215 of the each pair of adjacent segments 211. In FIG. 6A, the joint adhesive layer 224 is applied on one of the complementary finger joint profiles 215 (specifically, the finger joint profile 215 of the second segment 110B). The joint adhesive layer 224 may be continuous or patterned. The joint adhesive layer 224 may be applied at least partially between adjacent fingers 216 from the plurality of fingers 216. The joint adhesive layer 224 may include, for example, an epoxy adhesive. The joint adhesive layer 224 may include any suitable adhesive capable of bonding the each pair of adjacent segments 211. The complementary finger joint profiles 215 may facilitate bonding of the each pair of adjacent segments 211.

Figure 9A:
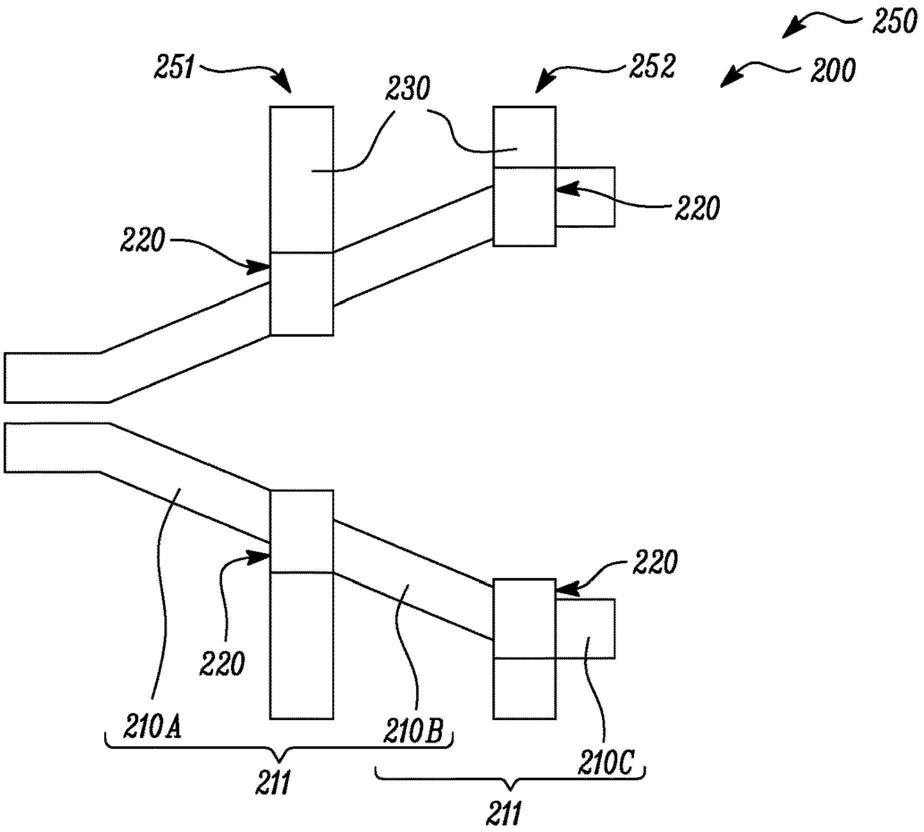
FIG. 9A is a schematic sectional side view of a composite bladed disk or rotor in accordance with an embodiment of the present disclosure.

At step 170, the method 100 further includes joining the each pair of adjacent segments to each other, such that the plurality of blades is retained within the plurality of slots. Referring to FIG. 9A, for example, the method 100 may include joining the each pair of adjacent segments 211 to each other, such that the plurality of blades 230 is retained within the plurality of slots 220.

In some embodiments, the each pair of adjacent segments 211 may be joined by heating the moulded component 200. Heat may be applied to the moulded component 200, for example, by placing the moulded component 200 in an oven.

In some embodiments, joining the each pair of adjacent segments may include curing the joint adhesive layer. For example, joining the each pair of adjacent segments 211 may include curing the joint adhesive layer 224 (shown in FIG. 6A). In some examples, the joint adhesive layer 224 may be cured by application of heat.

FIG. 9A shows a bladed disk or rotor 250 manufactured by the method 100 of FIG. 2.

In some embodiments, the moulded component may form a plurality of stages of the composite bladed disk or rotor. The plurality of blades of the each pair of adjacent segments may include a corresponding stage from the plurality of stages. Referring to FIG. 9A, for example, the moulded component 200 may form a plurality of stages 251, 252 of the composite bladed disk or rotor 250. In FIG. 9A, the composite bladed disk or rotor 250 may be a two-stage axial compressor (having a first stage 251 and a second stage 252). The plurality of blades 230 of the each pair of adjacent segments 211 includes a corresponding stage 251, 252 from the plurality of stages 251, 252.

As discussed above, each of the plurality of segments 210A, 210B, 210C may include a corresponding composite material from the plurality of composite materials that differ from each other. During use, the thermal environment may change along the axial length (i.e., along the component axis 205) of the composite bladed disk or rotor 250. Advantageously, the method 100 may allow forming the different segments 210A, 210B, 210C with composite materials having different thermal capability based on the thermal environment. For example, the third segment 210C may be made from a composite material that has a greater thermal capacity than that of the first segment 210A.

Referring to FIGS. 1 and 9A, in one aspect, the gas turbine engine 10 includes the bladed disk or rotor 250. Specifically, the low pressure compressor 14 and/or the high pressure compressor 15 may include the bladed disk or rotor 250.

Figure 9B:
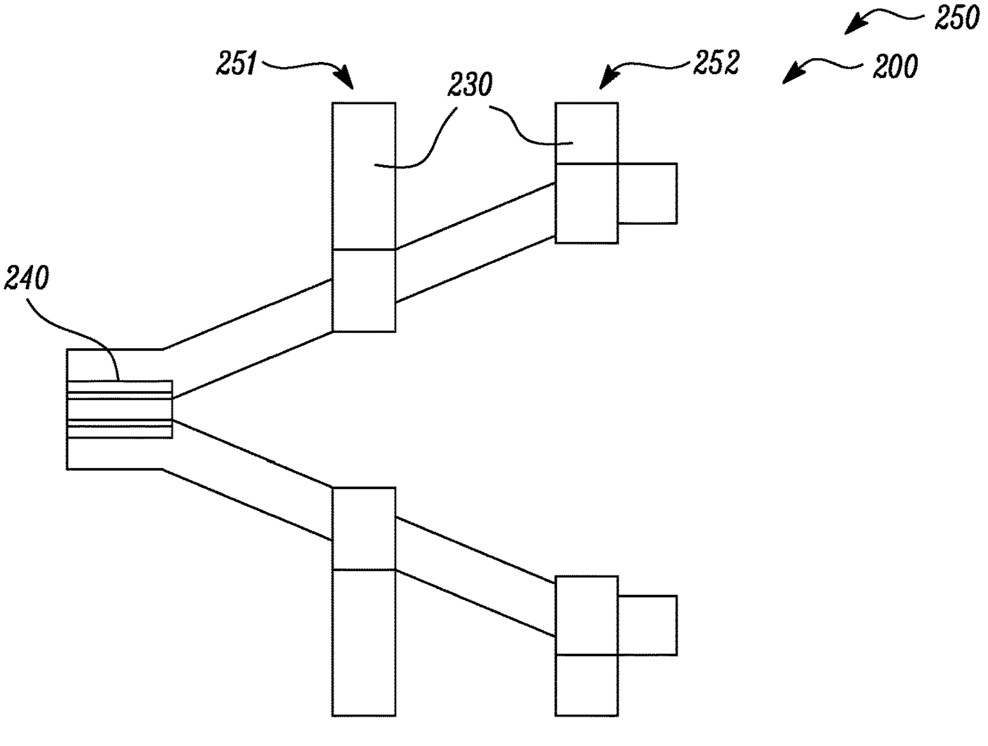
FIG. 9B is a schematic sectional side view of the composite bladed disk or rotor of FIG. 9A machined and including an insert in accordance with an embodiment of the present disclosure.

In some embodiments, the method 100 may further include coupling the moulded component 200 to a drive shaft (e.g., the interconnecting shaft 27) of the gas turbine engine 10. Referring to FIG. 1 and FIG. 9B, for example, the moulded component 200 may be machined to accept an insert 240. The insert 240 may be interference press-fitted to the moulded component 200. The insert 240 may be configured to accept a splined shaft (e.g., the interconnecting shaft 27) of the gas turbine engine 10, thereby allowing coupling of the moulded component 200 to the drive shaft of the gas turbine engine 10. The drive shaft may connect the composite bladed disk or rotor 250 to the turbine of the gas turbine engine 10.

The method 100 may facilitate mounting of the plurality of blades 230 to the moulded component 200. Specifically, mounting of the plurality of blades 230 to the moulded component 200 may be facilitated by providing the plurality of slots 220, positioning the plurality of blades 230 partially within the plurality of slots 220, and joining the each pair of adjacent segments 211 to each other. Each of the plurality of blades 230 may consequently be permanently trapped or retained within a corresponding slot 220 from the plurality of slots 220.

Further, the complementary finger joint profiles 215 may allow providing a reliable structural joint between the each pair of adjacent segments 211, which may be capable of withstanding loads during operation of the gas turbine engine 10. Moreover, the method 100 may allow tailoring the complementary finger joint profiles 215 to suit the duty/load case of the structural joint. That is, the design and size of the complementary finger joint profiles 215 may be modified according to the performance requirements. This may ensure that segmenting the moulded component 200 into the plurality of segments 210 and joining the plurality of segments 210 may not negatively affect the load bearing capacity of the moulded component 200.

The method 100 may further allow the use of blades 230 made from composite materials as well as metals and having different retention features (such as dovetail features and fir-tree features). The method 100 may also allow the use of various different composite materials as well as hybrid assemblies containing mixed classes of materials to manufacture the composite bladed disk or rotor 250, based on desired application requirements.

The method 100 may therefore be simple, economical, allow flexibility in material choice as per application requirements, and may be carried out without the need to use complex tooling and moulding processes.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method for manufacturing a composite bladed disk or rotor for a gas turbine engine, the method comprising the steps of:

forming a moulded component from at least one composite material, wherein the moulded component is axisymmetric about a component axis;

segmenting the moulded component into a plurality of segments disposed adjacent to each other, wherein each pair of adjacent segments from the plurality of segments comprises a pair of surfaces that is formed during segmentation of the moulded component;

providing, via computerised numerical control machining, complementary finger joint profiles on the pair of surfaces of the each pair of adjacent segments;

providing a plurality of slots on at least one of the pair of surfaces of the each pair of adjacent segments, wherein each of the plurality of slots at least partially extends along the component axis and perpendicularly to the component axis;

positioning a plurality of blades partially within the plurality of slots;

mating the complementary finger joint profiles provided on the pair of surfaces of the each pair of adjacent segments; and joining the each pair of adjacent segments to each other, such that the plurality of blades is retained within the plurality of slots.

2. The method of claim 1, wherein forming the moulded component comprises depositing the at least one composite material on a mandrel.

3. The method of claim 2, further comprising removing the mandrel from the moulded component prior to segmenting the moulded component.

4. The method of claim 1, wherein the moulded component forms a plurality of stages of the composite bladed disk or rotor, and wherein the plurality of blades of the each pair of adjacent segments comprises a corresponding stage from the plurality of stages.

5. The method of claim 1, wherein the at least one composite material comprises a plurality of composite materials that differ from each other, and wherein each of the plurality of segments comprises a corresponding composite material from the plurality of composite materials.

6. The method of claim 1, wherein each of the complementary finger joint profiles comprises a plurality of circumferential fingers concentrically spaced apart from each other with respect to the component axis.

7. The method claim 1, wherein each of the complementary finger joint profiles comprises a plurality of fingers extending perpendicularly to the component axis.

8. The method of claim 1, wherein each adjacent segment of the each pair of adjacent segments has a section thickness defined perpendicularly to the component axis, wherein each of the complementary finger joint profiles comprises a plurality of fingers, wherein each of the plurality of fingers has a length defined along the component axis, and wherein the length is from 0.5 times to 2 times of the section thickness.

9. The method of claim 1, wherein each of the plurality of slots is a dovetail slot.

10. The method of claim 1, further comprising applying a joint adhesive layer on at least one of the complementary finger joint profiles prior to mating the complementary finger joint profiles of the each pair of adjacent segments.

11. The method of claim 10, wherein joining the each pair of adjacent segments comprises curing the joint adhesive layer.

12. The method of claim 1, further comprising applying a slot adhesive layer in each of the plurality of slots prior to positioning the plurality of blades partially within the plurality of slots, such that each of the plurality of blades is bonded to at least one of the each pair of adjacent segments.

13. The method of claim 1, further comprising:

providing an alignment feature on the each pair of adjacent segments; and aligning the each pair of adjacent segments with each other based on the alignment feature prior to mating the complementary finger joint profiles of the each pair of adjacent segments.

14. The method of claim 1, further comprising coupling the moulded component to a drive shaft of the gas turbine engine.

15. The composite bladed disk or rotor manufactured by the method of claim 1.

16. The gas turbine engine that includes a composite bladed disk or rotor of claim 15.

* * * * *